US008076885B2

(12) United States Patent
Heravi et al.

(10) Patent No.: US 8,076,885 B2
(45) Date of Patent: Dec. 13, 2011

(54) INTEGRATED OVERLOAD AND LOW VOLTAGE INTERRUPT MODULE

(75) Inventors: Oliver Heravi, Tigard, OR (US); Kip E. Clohessy, Milwaukie, OR (US); Fred L. Ewer, Clackamas, OR (US)

(73) Assignee: Warn Industries, Inc., Clackamas, OR (US)

(*) Notice: Subject to any disclaimer, the term of this patent is extended or adjusted under 35 U.S.C. 154(b) by 693 days.

(21) Appl. No.: 12/121,244

(22) Filed: May 15, 2008

(65) Prior Publication Data

US 2009/0284877 A1    Nov. 19, 2009

(51) Int. Cl.
*H02P 7/00* (2006.01)

(52) U.S. Cl. ... 318/434; 320/128; 320/136; 318/400.21; 318/400.38

(58) Field of Classification Search .......... 318/280, 318/433, 434, 783, 800, 400.38; 180/7.5, 180/65.1; 198/320; 242/903; 172/12, 103; 100/346, 147; 310/49.02; 335/40; 320/128, 320/134, 136, 152, 156, 164, 165; 212/323
See application file for complete search history.

(56) References Cited

U.S. PATENT DOCUMENTS

| | | | | |
|---|---|---|---|---|
| 3,893,021 A | | 7/1975 | Meador et al. | |
| 4,061,949 A | * | 12/1977 | Griffis | 318/154 |
| 4,873,474 A | * | 10/1989 | Johnson | 318/434 |
| 4,888,661 A | * | 12/1989 | Belbel et al. | 361/102 |
| 4,911,373 A | | 3/1990 | Roberts | |
| 5,214,359 A | * | 5/1993 | Herndon et al. | 318/434 |
| 5,473,495 A | * | 12/1995 | Bauer | 361/11 |
| 5,648,887 A | * | 7/1997 | Herndon et al. | 361/31 |
| 5,995,347 A | * | 11/1999 | Rudd et al. | 361/24 |
| 6,020,702 A | * | 2/2000 | Farr | 318/434 |
| 6,037,749 A | * | 3/2000 | Parsonage | 320/132 |
| 6,046,893 A | | 4/2000 | Heravi | |
| 6,378,217 B1 | * | 4/2002 | Takamura et al. | 30/362 |
| 6,614,637 B1 | * | 9/2003 | Smith | 361/93.1 |
| 6,864,650 B2 | * | 3/2005 | Heravi et al. | 318/280 |
| 6,995,682 B1 | | 2/2006 | Chen et al. | |
| 7,262,947 B2 | | 8/2007 | Heravi et al. | |
| 7,511,443 B2 | * | 3/2009 | Townsend et al. | 318/568.2 |
| 7,791,849 B2 | * | 9/2010 | Davison et al. | 361/42 |

* cited by examiner

*Primary Examiner* — Walter Benson
*Assistant Examiner* — Antony M Paul
(74) *Attorney, Agent, or Firm* — Harness, Dickey & Pierce, P.L.C.

(57) ABSTRACT

A power management module for a winch system comprises an overload and low voltage interrupt module within a housing. The overload interrupt determines operating current for the winch system and provides an interrupt signal when the current is greater than a threshold. The low voltage interrupt determines voltage of a power source and provides an interrupt signal when the voltage is less than a threshold. A method of operating the power management module comprises determining operating current of the winch system with an overload interrupt module and voltage of a vehicle power source with a low voltage interrupt module. The overload and low voltage interrupt modules are located within a housing. The overload interrupt provides an interrupt signal when the operating current is greater than a threshold. The low voltage interrupt provides an interrupt signal when the voltage is less than a threshold.

13 Claims, 7 Drawing Sheets

INTEGRATED OVERLOAD AND LOW VOLTAGE INTERRUPT MODULE

FIELD

The present disclosure relates to an electrically powered device, and more particularly to an integrated module, which compensates for both an overload and a low voltage condition in a battery and/or charging system of an electrically powered device.

BACKGROUND

The statements in this section merely provide background information related to the present disclosure and may not constitute prior art.

Winches support a wide range of applications and assume a variety of sizes and types in order to pull or lift heavy loads. Winches can be powered by electric, hydraulic, pneumatic or internal combustion drives. For example, in electrically powered applications the winch receives a voltage supply from a vehicle battery and/or auxiliary power source to power a winch motor.

Winches are typically rated to a value, such as 10,000 lb, indicating a maximum applied force that internal load-bearing components may withstand. A load-sensing device may monitor the load level and protect for errant values attributable to external factors, such as noise, ripple voltage, and/or transient voltage in the vehicle supply voltage caused by an alternator, an ignition system, or other accessories. When uncorrected, these external factors may cause premature shut-off of the winch. Such a device, described in commonly assigned U.S. Pat. No. 6,046,893 (programmable electronic current limiter), U.S. Pat No. 5,648,887 (multi-state electronic current limiter), U.S. Pat No. 5,214,359 (electronic current limiter), and U.S. Pat No. 4,873,474 (load limiter), is incorporated herein by reference.

Frequent use of the winch may result in an excessive demand for current from the electrical supply. The current used by the winch may exceed the current supplied to the battery from the alternator. Continuous operation of the winch under this condition depletes the battery current, causing decay in battery voltage. Low battery voltage may cause performance issues with the winch and/or other accessories in the vehicle electrical system. For example, low battery voltage reduces speed of the winch motor, necessitating operation of the motor for a longer period in order to pull a given load. Additionally, the battery may not be able to provide sufficient power to operate needed accessories, or may not be able to restart the vehicle engine. A low voltage interrupt module as described in commonly assigned U.S. Pat. No. 7,262,947 may successfully obviate this problem.

SUMMARY

A power management module for an electrical winch system comprises an overload interrupt module and a low voltage interrupt module located within a housing. The overload interrupt module determines an operating current for the winch system and provides a first interrupt signal when the current is greater than a threshold current. The low voltage interrupt module determines a voltage of a power source of the vehicle and provides a second interrupt signal when the voltage is less than a threshold voltage.

In another aspect of the invention, a method of operating a power management module for an electrical winch system comprises determining an operating current of the winch system with an overload interrupt module and determining a voltage of a power source of a vehicle with a low voltage interrupt module. The overload interrupt module and the low voltage interrupt module are located within a housing. The overload interrupt module provides a first interrupt signal when the operating current is greater than a threshold current. The low voltage interrupt module provides a second interrupt signal when the voltage is less than a threshold voltage.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figure 6A:
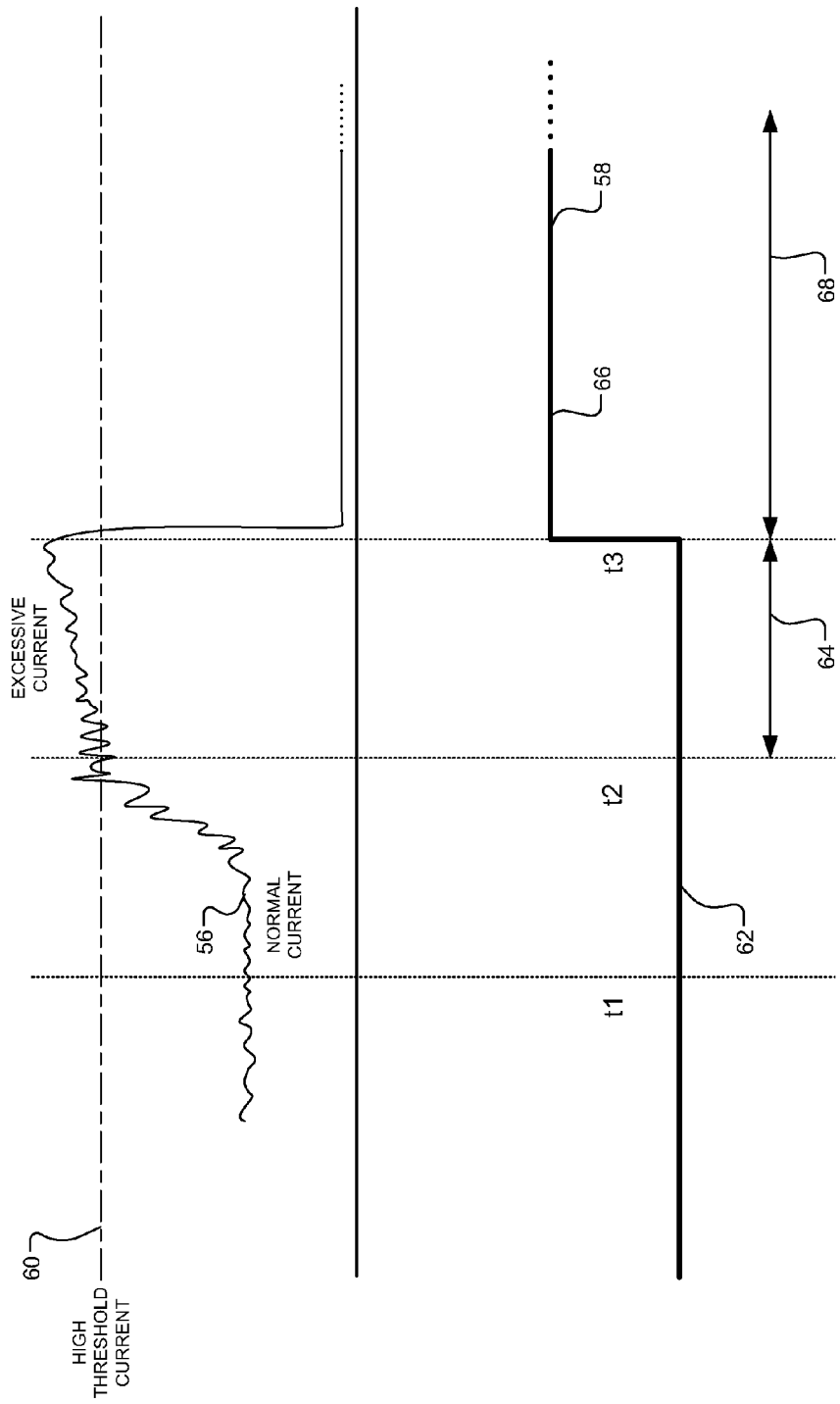
Figure 6B:
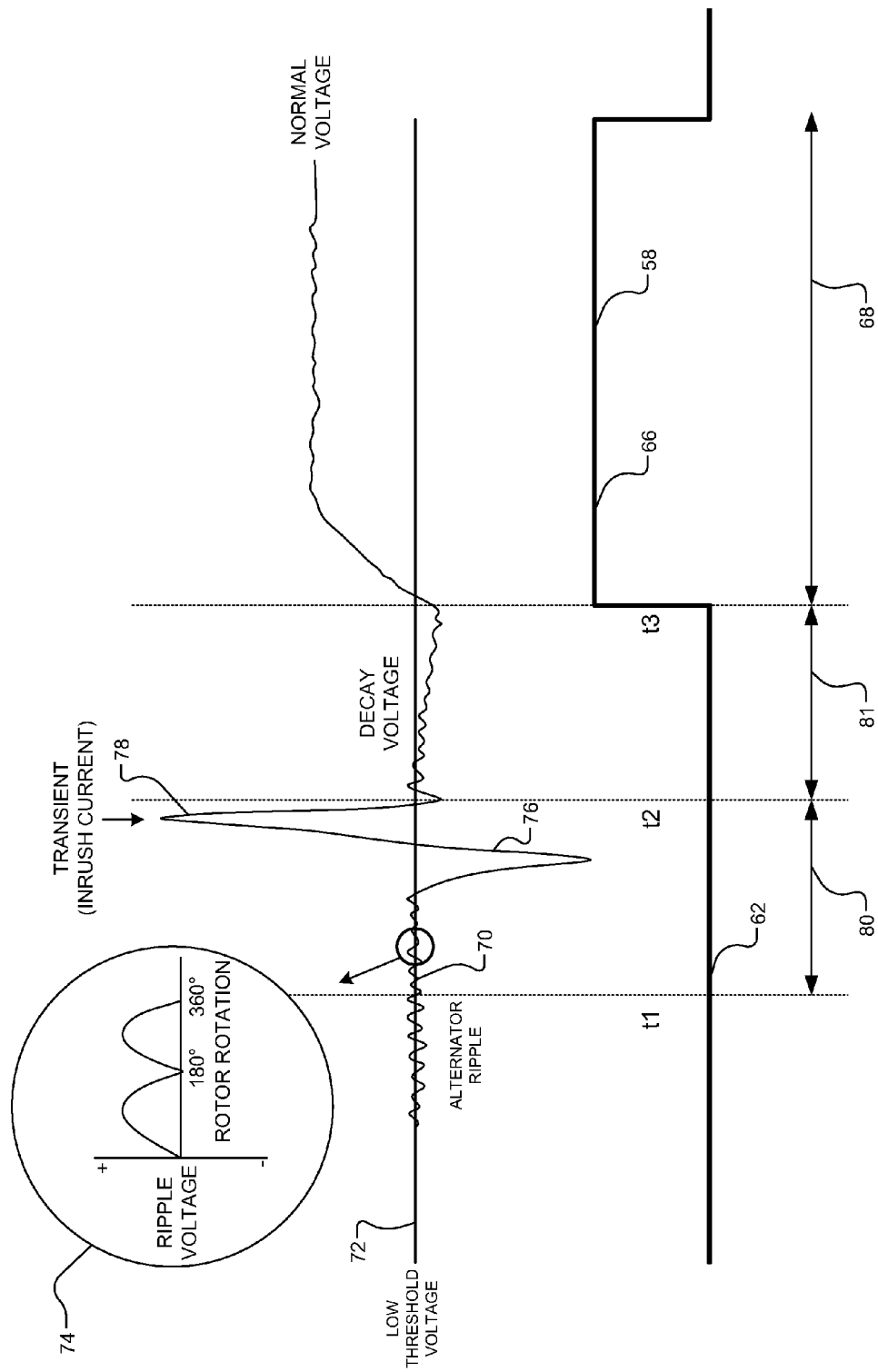
Figure 7:
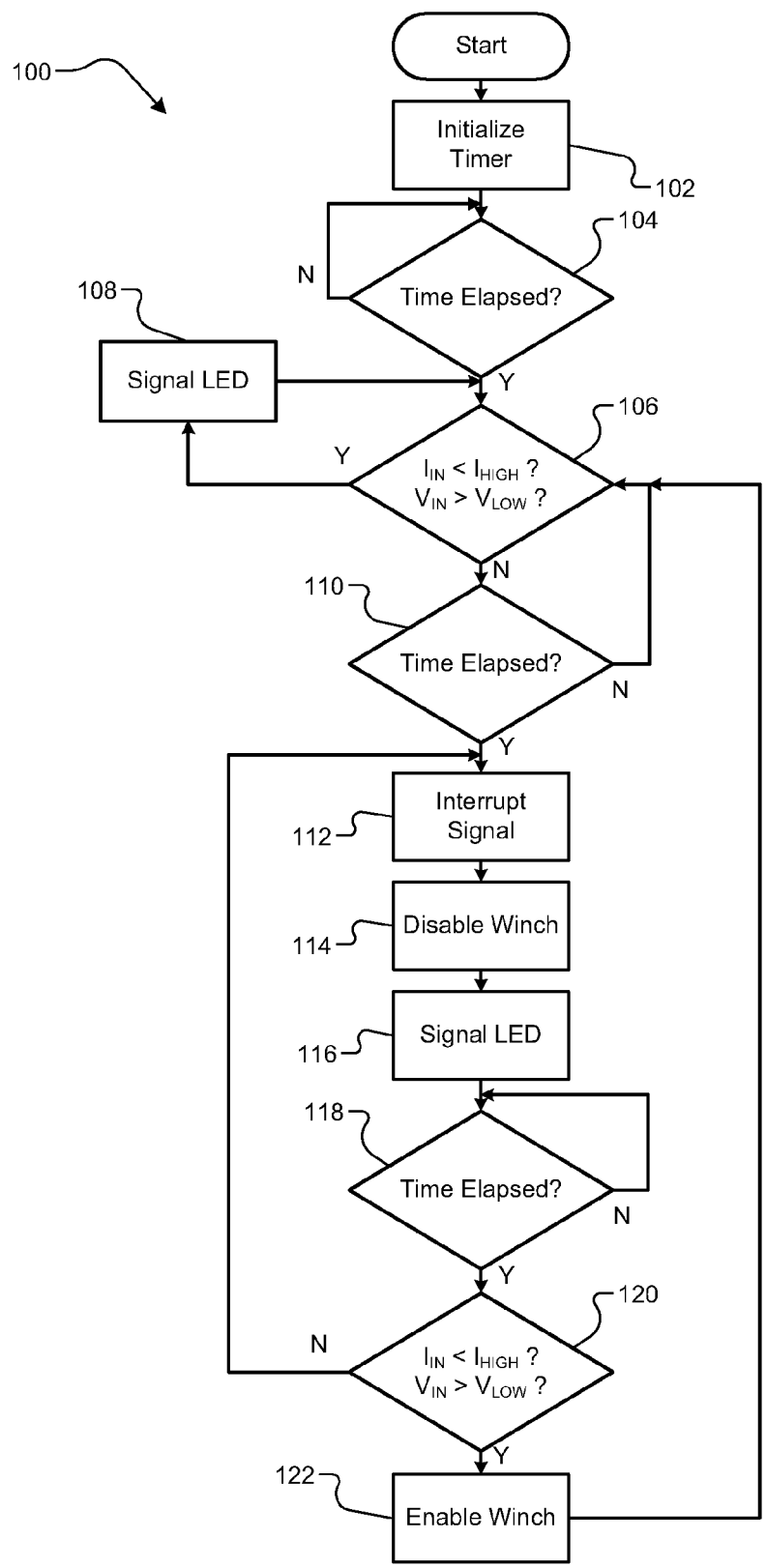

FIG. 6A graphically illustrates a Hall Effect sensor voltage and a corresponding interrupt signal according to the present disclosure;

FIG. 6B graphically illustrates a battery voltage and a corresponding interrupt signal according to the present disclosure; and FIG. 7 is a flow diagram of a power management module method according to the present disclosure.

DETAILED DESCRIPTION

The following description is merely exemplary in nature and is not intended to limit the present disclosure, application, or uses. It should be understood that throughout the drawings, corresponding reference numerals indicate like or corresponding parts and features. As used herein, the term module refers to an electronic circuit, a processor (shared, dedicated, or group) and memory that execute one or more software or firmware programs, a combinational logic circuit, and/or other suitable components that provide the described functionality.

Figure 1:
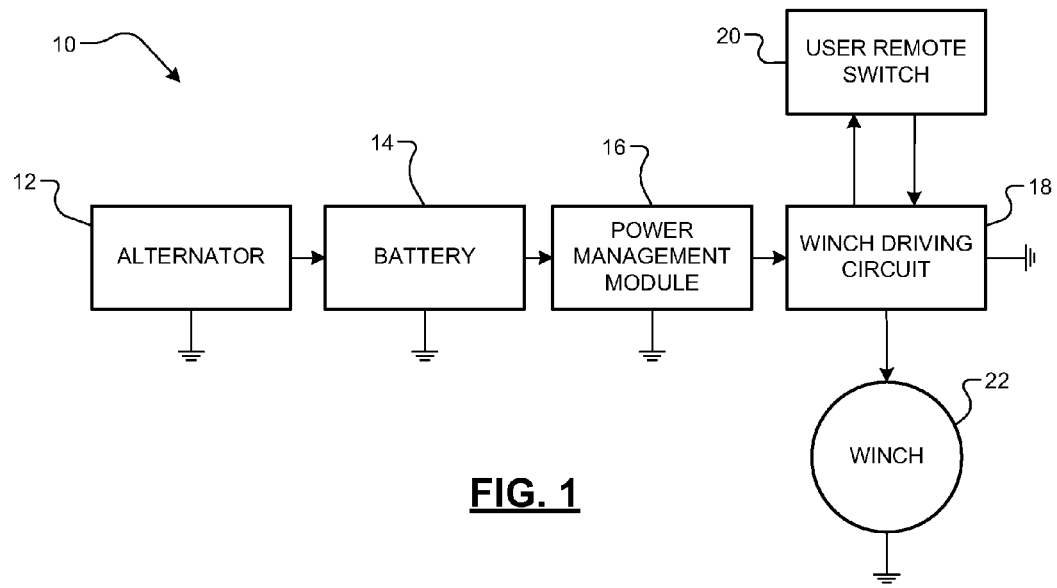
FIG. 1 is a functional block diagram of a winch system according to the present disclosure.

Referring now to FIG. 1, a winch system 10 includes an alternator 12, a battery 14, a power management module 16, a winch driving circuit 18, a user remote switch 20, and a winch device 22. The alternator 12 charges the battery 14, which in turn supplies electrical power to various accessories in a vehicle. For example, the battery 14 provides electrical power to the vehicle accessories such as the headlights, tail lights, HVAC blower motor, and radio. The battery 14 may also provide electrical power to additional devices found in the winch system 10, such as the power management module 16. The power management module 16, in turn, powers the winch driving circuit 18, including a solenoid pack (not shown) and the winch device 22. An operator may manipulate the user remote switch 20 to effect movement of the winch device 22. The operator may also connect a processing device (not shown) to the power management module 16 to program the winch device 22.

Figure 2:
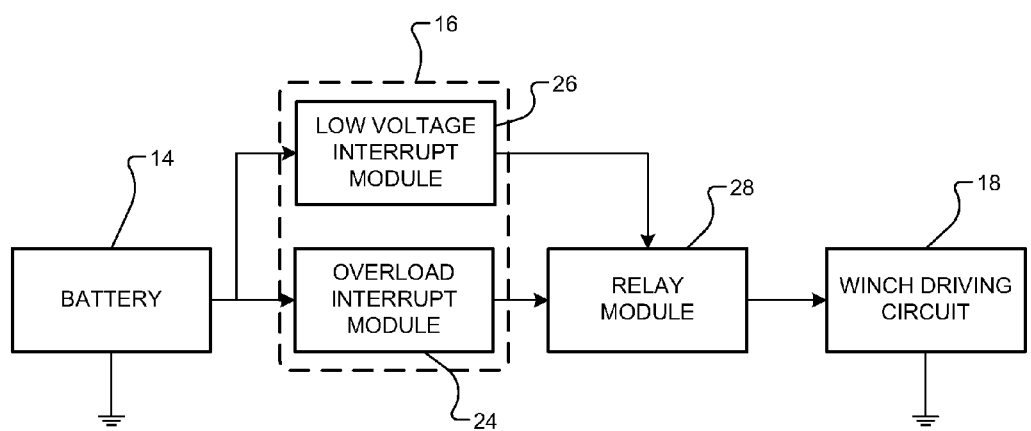
FIG. 2 is an exploded functional block diagram of a power management module according to the present disclosure.

Referring now to FIG. 2, the power management module 16 includes an overload interrupt module 24 and a low voltage interrupt module 26. The overload interrupt module 24 and the low voltage interrupt module 26 control a relay module 28 based on a measured current and voltage, respectively. For example, the overload interrupt module 24 may measure a current output from the battery 14 to the winch system 10 and determine whether the current exceeds a predetermined threshold. When the current exceeds the threshold, the overload interrupt module 24 sends a signal to the relay module 28 to cease operation of the winch device 22.

Similarly, the low voltage interrupt module 26 may measure a voltage of the battery 14. When the voltage falls below a predetermined threshold, the low voltage interrupt module 26 sends a signal to the relay module 28 to cease operation of the winch device 22 until the voltage returns to a desired level. U.S. Pat. No. 7,262,947 describes an exemplary low voltage interrupt module, which is incorporated herein by reference in its entirety. Accordingly, the overload interrupt module 24 and the low voltage interrupt module 26 may work separately or in concert to cease operation of the winch device 22 until the current and/or voltage return to desired levels. In addition, certain applications may require disablement of either the overload interrupt module 24 or the low voltage interrupt module 26. The operator may accomplish the disablement by programming the appropriate module to a level where it would no longer be in use.

Figure 3:
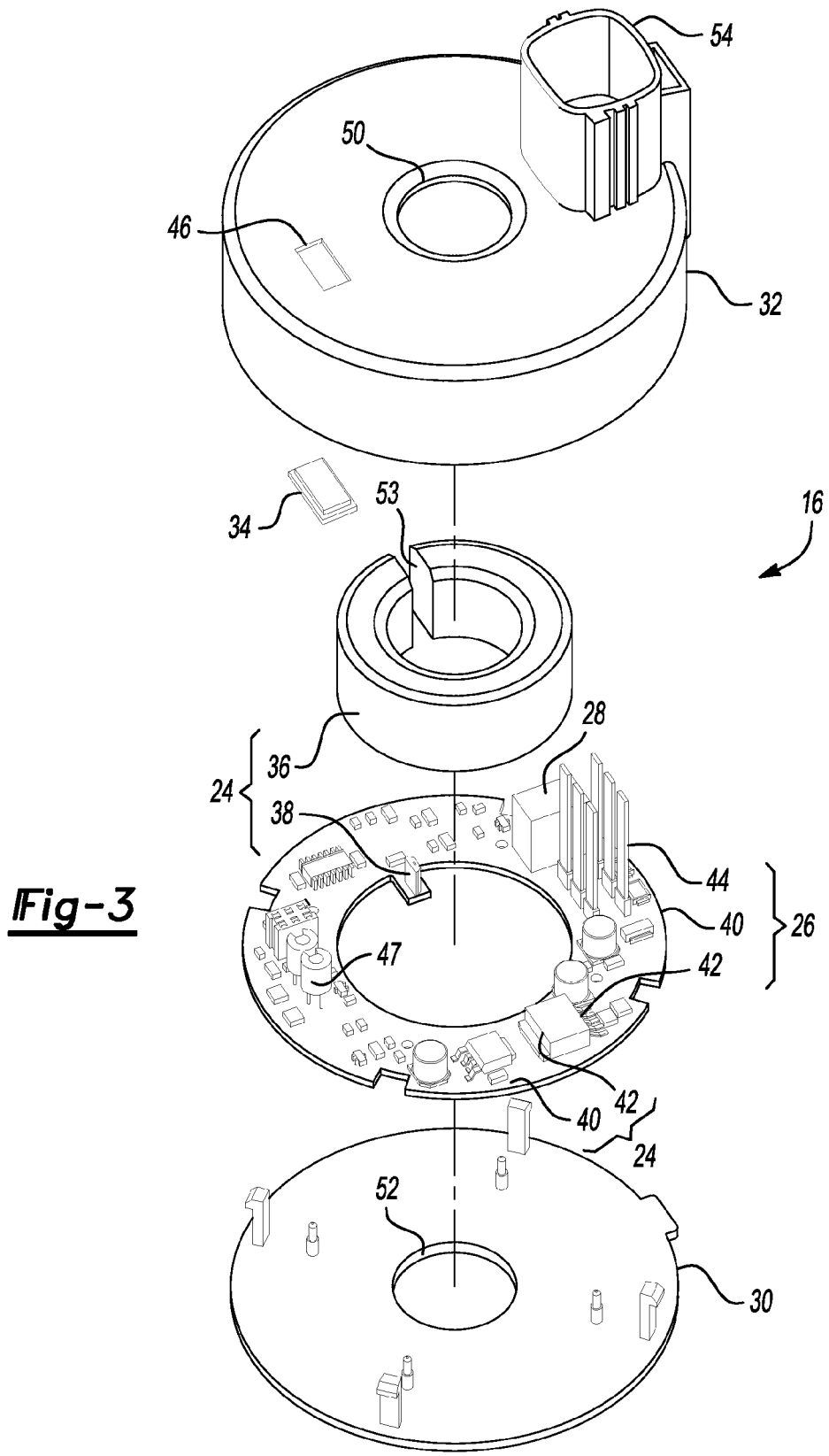
FIG. 3 is an exploded perspective view of an exemplary embodiment of an integrated overload and low voltage interrupt module according to the present disclosure.
Figure 4:
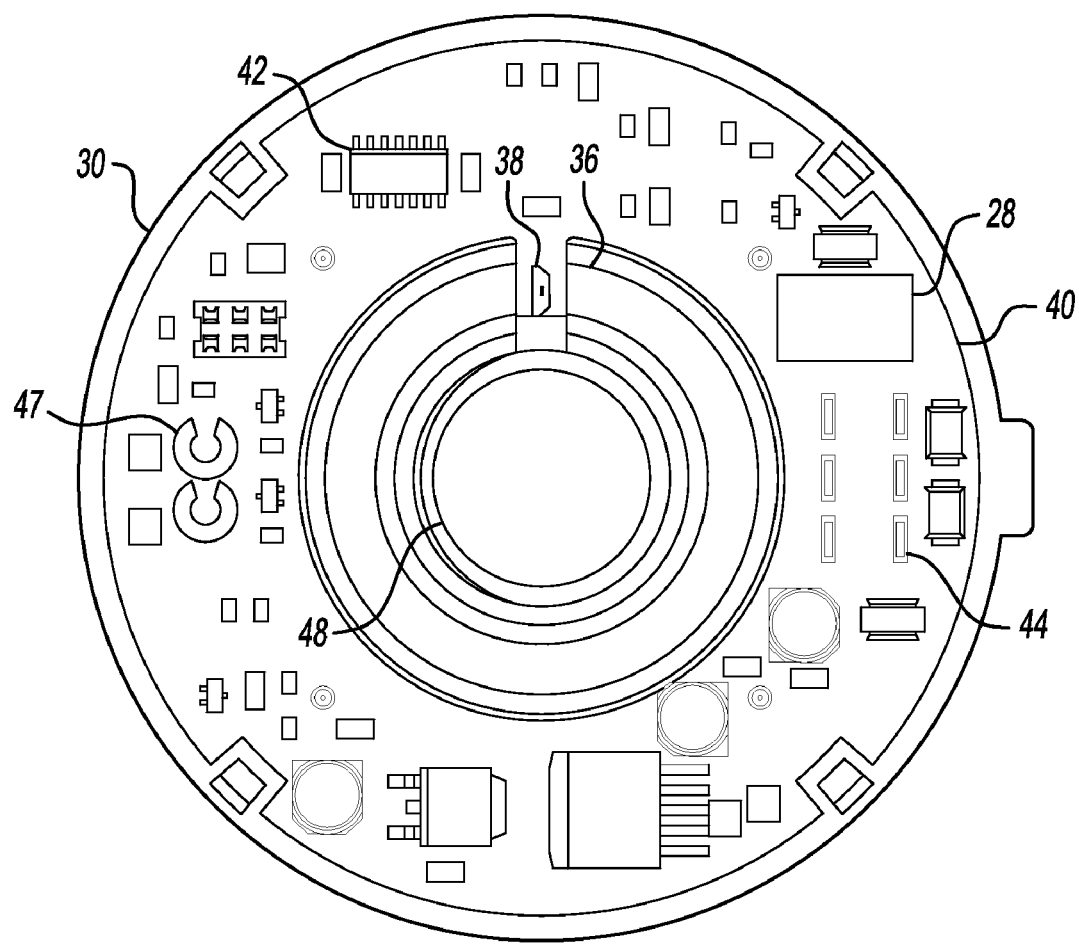
FIG. 4 is a top sectional view of the integrated overload and low voltage interrupt module of FIG. 3.

Referring now to FIGS. 3 and 4, the power management module 16 is shown to include the overload interrupt module 24, the low voltage interrupt module 26, a housing base plate 30 and a housing cover 32 (referred to collectively as the housing 30, 32), and a window 34. The overload interrupt module 24 includes a toroid 36, a Hall Effect Sensor 38, various components of a printed circuit board (PCB) 40, and a microcontroller unit (MCU) 42. The low voltage interrupt module 26 includes the PCB 40, the MCU 42, and one or more connector pins 44. In the present implementation, the overload interrupt module 24 and the low voltage interrupt module 26 each utilize the PCB 40 and the MCU 42. In other words, the overload interrupt module 24 and the low voltage interrupt module 26 are integrated within the housing 30, 32 of the power management module 16. In another implementation, the PCB 40 may include separate MCUs for the overload interrupt module 24 and the low voltage interrupt module 26.

The housing cover 32 includes an aperture 46 for receivably attaching the window 34. Light-emitting diodes (LED) 47 located within the power management module 16 and visible to the operator through the window 34 may provide system feedback. For example, when the winch system 10 is in a shutoff mode due to current overload or low voltage levels the LED 47 may alert the operator of the corresponding fault condition. The LED 47 may activate in various combinations or may blink/flash to indicate other operating conditions or faults.

The power management module 16 encircles a cable or wire 48 carrying electrical power (i.e. current) from the battery 14 to the winch device 22. The wire 48 may travel through a central housing cover opening 50, through the toroid 36 and the PCB 40, and through a central housing base opening 52. The toroid 36 includes a circular ring-shaped magnetic core having an air gap 53. The design of the toroid 36 results in a closed magnetic path for largely confining magnetic flux to the core, which prevents energy from affecting other components of the power management module 16. The overload interrupt module 24, via the toroid 36, detects a magnetic field generated by current flowing through the wire 48. The toroid 36 is magnetically coupled to the Hall Effect sensor 38 located on the PCB 40. The Hall Effect sensor 38 varies its output voltage in response to changes in the magnetic flux lines concentrated in the toroid air gap 53. The MCU 42 communicates with the Hall Effect sensor 38 and receives a signal corresponding to the output voltage of the Hall Effect sensor 38.

The low voltage interrupt module 26 detects the voltage of the battery 14 via one of the connector pins 44. The voltage may be sensed and sent to the MCU 42 through the corresponding one of the connector pins 44. Further, the connector pins 44 may provide other signals and functions including, but not limited to power for the power management module 16; ground for the power management module 16; remote switch monitoring activity and state; indicating power in/power out; voltage sense; and programming of the MCU 42. The connector pin that receives power for the power management module 16 may also provide the voltage sense signal.

The housing 30, 32 (including window 34, 46) encloses the power management module 16 through hermetic sealing of the housing base plate 30 and the housing cover 32. Consequently, the housing 30, 32 protects the power management module 16 from natural sources (e.g. moisture and debris) and from operator adjustment. Further, the housing cover 32 may incorporate an integrated male connector 54 over the connector pins 44. The male connector 54 sealingly receives a female connector for carrying system information to and from the power management module 16.

Figure 5:
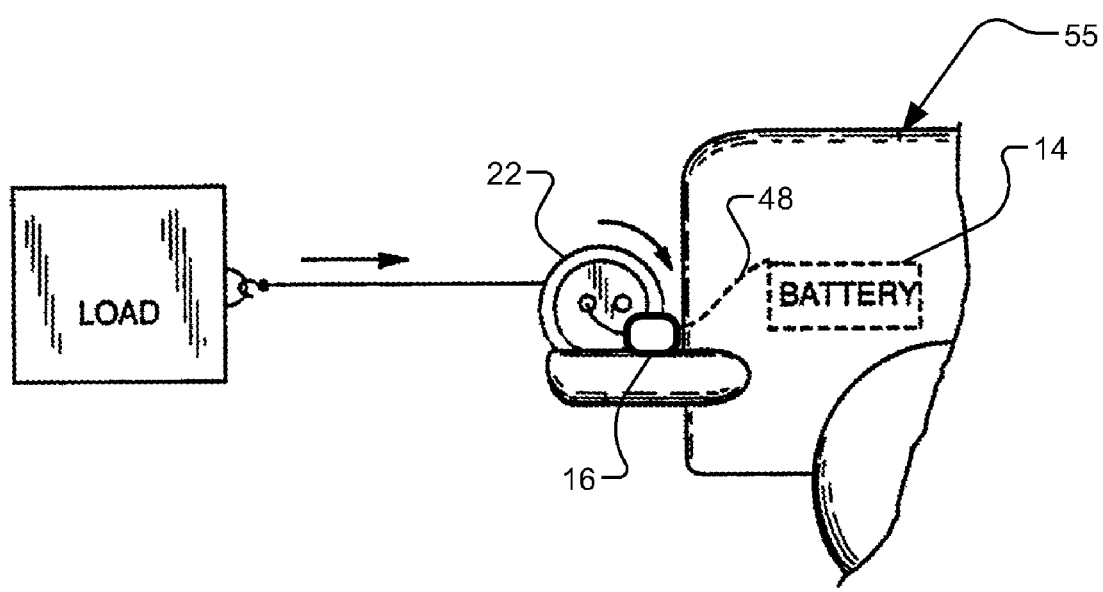
FIG. 5 is a perspective view of a vehicle having an integrated overload and low voltage interrupt module according to the present disclosure.

Referring now to FIG. 5, an exemplary vehicle 55 incorporating the winch device 22 and the power management module 16 is shown. Although the winch device 22 is depicted in close proximity to the battery 14, the winch device 22 may be located further away from the battery 14. The power management module 16 is located on the wire 48 that provides power from the battery 14 to the winch device 22. The power management module 16 may be located to allow the LED 47 to be visible to the operator during operation of the winch device 22.

Referring now to FIG. 6A, a graphical depiction of a current 56 received by the Hall Effect sensor 38 and a corresponding interrupt signal 58 received by the MCU 42 is shown. While load conditions exceeding a high threshold current 60 are possible for shortened times, a large magnitude load for an extended time may be undesirable.

At time t1, the current 56 depicted below the high threshold current 60 corresponds to a typical operating load level. While the current 56 remains below the high threshold current 60, the interrupt signal 58 is at a first state 62 (time t1 through time t2). At time t2, an excessive load condition (i.e. load bind) is experienced and the current 56 exceeds the high threshold current 60.

At time t3, the MCU 42 senses that the current 56 has exceeded the high threshold current 60 for a predetermined time 64. The MCU 42 causes the interrupt signal 58 to change from the first state 62 to a second state 66. For example, the interrupt signal 58 may change from 0 v to 5 v. When the interrupt signal 58 is in the second state 66, the relay module 28 is energized, interrupting current through the solenoids and ceasing operation of the winch device 22. The relay module 28 is energized for a disable time 68 to allow the winch system 10 to return to a normal load level. After the disable time 68 has elapsed, the MCU may de-energize the relay module 28. Alternatively, the relay module 28 may be energized until the power management module 16 is reset by sensing a power out signal from the user remote switch 20.

Referring now to FIG. 6B, a graphical depiction of a voltage signal 70 received from the connector pin dedicated to voltage sense and the corresponding interrupt signal 58 generated by the MCU 42 is shown. At time t1, the voltage signal 70 is on average approximately equal to or slightly above a low threshold voltage 72. For example, a nominal voltage of the voltage signal 70 may be 12 v and the low threshold voltage 72 may be 10 v. The interrupt signal 58 is again at the first state 62. While the voltage signal 70 provided by the battery 14 is a DC voltage, the operation of the alternator 12 and the winch system 10 causes a ripple voltage 74 in the voltage signal 70. In certain circumstances, the ripple voltage 74 causes the voltage signal 70 to drop below the low threshold voltage 72. The voltage signal 70 may be rectified or filtered to minimize the effect of the ripple voltage 74.

A voltage dip 76 and a transient 78 as a result of initial inrush current at startup of operation of the winch device 22 are shown. Both the voltage dip 76 and the transient 78 last for less than a predetermined time 80 and are thus disregarded. However, if the alternator 12 is not able to charge the battery 14 enough to compensate for the current required by the winch device 22, the voltage signal 70 begins to decay below the low threshold voltage 72 as shown beginning at time t2. At time t3, the MCU 42 senses that the voltage signal 70 has decayed below the low threshold voltage 72 for a predetermined time 81. The MCU 42 causes the interrupt signal 58 to change from the first state 62 to the second state 66. For example, the interrupt signal 58 may change from 0 v to 5 v. When the interrupt signal 58 is in the second state 66, the relay module 28 is energized, interrupting the current through the solenoids and the winch driving circuit 18. The relay module 28 is again energized for the disable time 68 to allow the alternator 12 to charge the battery 14. For example, the disable time 68 may be 30 seconds. After the disable time 68 has elapsed, the MCU 42 determines if the voltage signal 70 is still below the low threshold voltage 72. If the voltage signal 70 is below the low threshold voltage 72 after the disable time 68 has elapsed, the MCU 42 continues to energize the relay module 28. Alternatively, the relay module 28 may remain energized until the MCU 42 senses that the voltage signal 70 is above the low threshold voltage 72.

Referring now to FIG. 7, a method 100 of operating a power management module is described. The method 100 starts when the winch system 10 switches to an operational mode. A system timer initializes at Step 102. As discussed above with respect to FIG. 6B, operation of the winch device 22 may have voltage inconsistencies due to ripple and inrush current. Operation of the system timer ensures that the method 100 does not send the interrupt signal 58 prematurely. Initial voltage values may be disregarded during a specified time, such as 50 ms, to remove effects of unstable voltage signals at startup. In Step 104, the method 100 determines whether the proper time has elapsed.

In Step 106, the method 100 determines if the current 56 and the voltage signal 70 are within threshold limits 60, 72. The measurement of the current 56 and the voltage signal 70 in Step 106 can occur sequentially or concurrently. If the current 56 and the voltage signal 70 are within the threshold limits 60, 72, a signal initiates the LED 47 for user feedback (Step 108). The system then continues to re-measure the current 56 and the voltage signal 70 until an errant value is obtained.

If the current 56 and the voltage signal 70 are outside of the threshold limits 60, 72, the method 100 proceeds to Step 110. For example, the voltage signal 70 may be below the low threshold voltage 72 due to operation of other vehicle devices or the current 56 may be above the high threshold current 60 due to an excessive weight load. In either of these cases, the method 100 determines if the current 56 and the voltage signal 70 are outside of the threshold limits 60, 72 for the predetermined time 64, 80. If the predetermined time 64, 80 has not been exceeded, the method 100 returns to Step 106, otherwise the interrupt signal 58 is sent to the winch driving circuit 18 (Step 11 2). The winch driving circuit 18 disables the winch device 22 in Step 114 and then sends a signal to initiate the LED 47 for user feedback in Step 116.

At Step 118, comparison with an interrupt timer determines if the interrupt signal 58 has been active for the disable time 68. The interrupt timer ensures that the winch device 22 is disabled for the disable time 68 before allowing the winch device 22 from being re-enabled. For example, the disable time 68 may be 30 seconds. If the disable time 68 has not elapsed, the method 100 repeats Step 118. The MCU 42 continues to send the interrupt signal 58 to the winch driving circuit 18 until the disable time 68 has elapsed.

If the disable time 68 is elapsed at Step 118, the method 100 rechecks the current 56 and the voltage signal 70 at Step 120. If the current 56 and the voltage signal 70 are still outside of the voltage threshold limits 60, 72, the method 100 returns to Step 112. If the current 56 and the voltage signal 70 are within the voltage threshold limits 60, 72, the method 100 re-enables the winch device 22. The method 100 then continues to check for the current 56 and the voltage signal 70 at Step 106.

Although the power management module 16 is currently being described for a winch system 10 application, it is anticipated that the module 16 may be used in other applications having high powered loads, such as a compressor or an inverter. In stand-alone applications, such as those in industrial settings, the module 16 may receive power through an auxiliary power source.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A power management module for an electrical winch system of a vehicle, the power management module comprising:
    an overload interrupt module that determines an operating current of the winch system and that provides a first interrupt signal when said current is greater than a threshold current, wherein said overload interrupt module includes a toroid that, to detect said operating current, encircles a wire that provides said operating current from a power source of said vehicle;
    a low voltage interrupt module that determines a voltage of said power source and that provides a second interrupt signal when said voltage is less than a threshold voltage; and
    a housing, wherein each of said overload interrupt module, said toroid, and said low voltage interrupt module are located within said housing;
    a printed circuit board (PCB) located within said housing, wherein:
        said PCB includes said low voltage interrupt module; and
        said PCB has an annular shape and encircles said wire; and
    a Hall Effect sensor that generates an output voltage indicative of said operating current, wherein:
        said toroid includes an air gap; and said Hall Effect sensor is located on said PCB within said air gap.

2. The power management module of claim 1 wherein a relay module interrupts said operating current based on at least one of said first interrupt signal and said second interrupt signal.

3. The power management module of claim 1 further comprising an indicator that indicates one or more states associated with the power management module.

4. The power management module of claim 3 wherein said indicator includes at least one light emitting diode (LED).

5. The power management module of claim 4 wherein said LED is located within said housing and said housing includes an aperture that is located based on said LED.

6. The power management module of claim 1, wherein said housing has a toroid shape and encircles said wire.

7. A method of operating a power management module for an electrical winch system of a vehicle, the method comprising:
- determining an operating current of the winch system with an overload interrupt module;
- providing a first interrupt signal when said operating current is greater than a threshold current;
- determining a voltage of a power source with a low voltage interrupt module;
- providing a second interrupt signal when said voltage is less than a threshold voltage;
- locating each of said overload interrupt module and said low voltage interrupt module within a housing;
- detecting said operating current of the winch system with a toroid; and
- encircling a wire with said toroid, said wire providing said operating current from a power source of the vehicle;
- locating a printed circuit board (PCB) having an annular shape within said housing;
- arranging said low voltage interrupt module on said PCB;
- encircling said wire with said PCB;
- locating a Hall Effect sensor on said PCB within an air gap of said toroid; and
- using said Hall Effect sensor, generating an output voltage indicative of said operating current.

8. The method of claim 7 further comprising:
- interrupting said operating current with a relay module based on at least one of said first interrupt signal and said second interrupt signal.

9. The method of claim 7 further comprising:
- indicating one or more states associated with the power management module.

10. The method of claim 9 wherein said indicating includes indicating with at least one light emitting diode (LED).

11. The method of claim 10 wherein said LED is located within said housing and said housing includes an aperture based on said LED.

12. The method of claim 7, wherein said toroid is located within said housing.

13. The method of claim 7, wherein said housing has a toroid shape and encircles said wire.

\* \* \* \* \*